J. J. HOOD
WATER MOTOR.
APPLICATION FILED MAY 1, 1918.
1,370,539.
Patented Mar. 8, 1921.
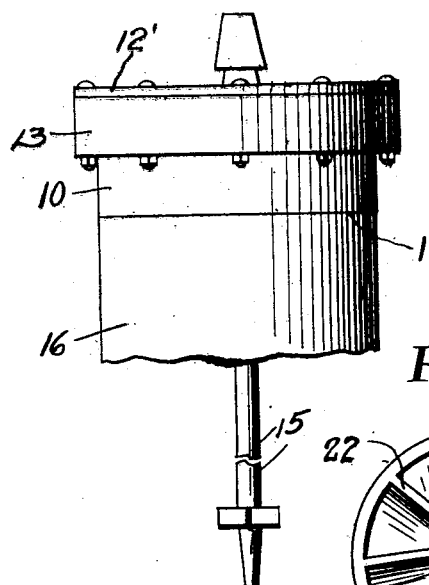
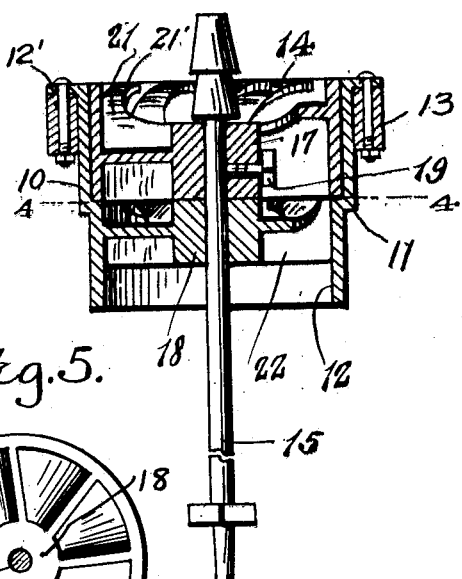
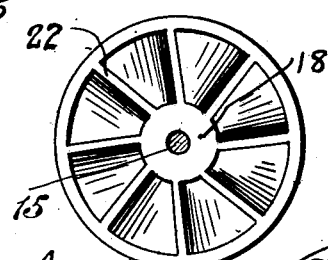
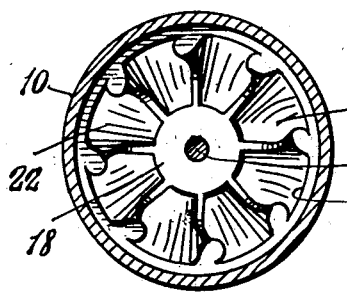
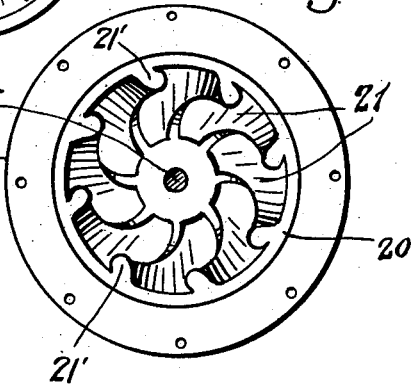
Inventor
J. J. Hood

UNITED STATES PATENT OFFICE.

JAMES J. HOOD, OF PONDER, GEORGIA, ASSIGNOR OF TWENTY-FIVE PER CENT. TO T. H. SAXON, OF PONDER, GEORGIA.

WATER-MOTOR.

1,370,539.  Specification of Letters Patent.  Patented Mar. 8, 1921.

Application filed May 1, 1918. Serial No. 231,894.

*To all whom it may concern:*

Be it known that I, JAMES J. HOOD, a citizen of the United States, residing at Ponder, in the county of Union and State of Georgia, have invented certain new and useful Improvements in Water-Motors; and I do hereby declare the following to be a full, clear, and exact description of the invention, such as will enable others skilled in the art to which it appertains to make and use the same.

The object of the invention is to provide a simple and inexpensive water motor of the turbine type, which is adapted to be used either in relatively small or large diameters, and with any preferred head of water and having a construction which is designed especially for economizing in the use of the operating fluid by preventing the passage of any portion thereof without having an effective action upon the wheel, to the end that a maximum of speed and power may be derived from the given head and quantity of water employed.

A further object of the invention is to provide a device of this type which may be set up in any place and in any position which may be most convenient to utilize the power of the available head of water.

Further objects and advantages will appear hereinafter, it being understood that changes in form and proportion may be resorted to within the scope of the appended claim without departing from the spirit of the invention.

In the drawings:

Figure 1 is a side view of a motor constructed in accordance with the invention.

Fig. 2 is an axial sectional view of the same.

Fig. 3 is a plan view of the motor looking down upon the same and as illustrated in Figs. 1 and 2.

Fig. 4 is a plan view of the deflecting member at the entrance of the casing, the same being shown as a horizontal section on the plane indicated by the line 4—4 of Fig. 2.

Fig. 5 is a detail plan view of the deflecting member.

In the illustrated embodiment of the invention, the device is shown in an axially vertical position, and consists essentially of a cylindrical casing 10 which is preferably shouldered or offset at 11 and has its lower reduced portion 12 connected to a trunk 16 so as to secure the desired and concentrated head of water. The upper end of the casing is provided with a flange 12' which rests against a suitable timber structure 13 to which it may be fastened or bolted, and a revoluble element or wheel 14 mounted within the casing and having a shaft 15 from which the power may be taken, the specific illustration of which is deemed unnecessary in this connection.

The wheel 14 is provided with a hub 17 which has a bearing upon a seat formed by a stationary hub 18 in the lower portion of the casing. Preferably the hub of the wheel is secured to the shaft 15 by means of a set screw 19 or other suitable key and the hub of the wheel is connected with the rim 20 thereof by means of blades 21 which are spirally disposed and concaved to form buckets to receive the impact of the water in order to impart the pressure thereof to the wheel in the most effective manner. The blades are preferably of a relatively gradual or shallow inclination at their upper or outlet ends 21', and the inclinatiton gradually increases toward the lower or inlet portions of the buckets formed thereby, the vertical or axially longitudinal lengths of the blades being such that in viewing the wheel from one end there is an entire occlusion of light, or in other words there is no possibility of water passing through the wheel without imparting pressure to the blades in the direction of rotation of the wheel. No water can pass directly in a path parallel with the axis of the wheel through the spaces between adjacent blades. This arrangement insures the most effective employment of the water used in connection therewith, and hence provides for the maximum power and speed of rotation of the device. The blades gradually decrease in width toward their outer ends 21', so as to permit the free discharge of water from the wheel.

In the bottom or inlet end of the casing, directly in front of the rotary wheel, and in a position to receive the impact of the water before it hits the blades of the wheel, is a deflecting means consisting of a series of blades 22 which are constructed substantially as are the blades of the wheel but are inclined in the opposite direction, the same however being spirally disposed around the solid or hub portion 18 above described, and being of a length from top to bottom which prevents the direct passage of any water therebetween without deflection in the direction of the spiral inclination of the blades. The advantage of this construction and arrangement of the blades of the deflecting means of the casing is that the water will be given a suitable whirling motion so as to act upon the bucket in a most favorable manner to obtain a large percentage of the power of the former. Wasteful escape of the pressure is thereby avoided, and the movement of the water through the rotary wheel and casing is such as to utilize the head of water to the best possible advantage.

The motor is of the axial flow type and the water enters from the bottom through the trunk 16.

A motor of the construction described may be used in either a vertical or a horizontal position or at any desired inclination.

It will also be obvious from the foregoing description that the entire volume or column of water furnished by the head formed in the trunk is forced to pass effectively through the wheel, and it is preferable to construct the hub of a considerable diameter, approximating half that of the wheel, so that the major portion of the flow of the water is directed against the blades positioned near the periphery of the wheel where obviously, it is most effective.

What is claimed is:

A wheel for a water motor comprising a hub, a rim circumscribing the hub and spaced from the same and positioned concentrically therewith, blades interposed between the hub and the rim, said blades having portions which extend the full length of the hub and which completely bridge the space between the hub and the rim, the said blades having end portions disposed beyond the end of the hub and which gradually diminish in transverse breadth from the hub toward the rim.

In testimony whereof I affix my signature in presence of two witnesses.

JAMES J. HOOD.

Witnesses:
 Jos. WILSON.
 MINNIE MILLER.